(12) United States Patent
Rausch et al.

(10) Patent No.: US 7,384,103 B2
(45) Date of Patent: Jun. 10, 2008

(54) LONGITUDINAL GUIDE RAIL FOR MOTOR VEHICLE SEAT

(75) Inventors: Peter Rausch, Coburg (DE); Jochen Hofmann, Marktgraitz (DE); Wolfgang Suck, Coburg (DE); Christina Schwerdtner, Neustadt (DE); Andrea Bauersachs, Ebersdorf (DE); Matthias Baudler, Coburg (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 471 days.

(21) Appl. No.: 10/512,182

(22) PCT Filed: Apr. 8, 2003

(86) PCT No.: PCT/DE03/01224

§ 371 (c)(1),
(2), (4) Date: Apr. 25, 2005

(87) PCT Pub. No.: WO03/093052

PCT Pub. Date: Nov. 13, 2003

(65) Prior Publication Data

US 2006/0061196 A1 Mar. 23, 2006

(30) Foreign Application Priority Data

Apr. 30, 2002 (DE) .............................. 102 20 951
Oct. 24, 2002 (DE) .............................. 102 50 212

(51) Int. Cl.
*B60R 21/00* (2006.01)
(52) U.S. Cl. ....................................... 297/473; 297/468
(58) Field of Classification Search ................ 248/429; 297/464, 344.1, 216.1, 273, 468, 463.1
See application file for complete search history.

(56) References Cited

U.S. PATENT DOCUMENTS 4,262,963 A 4/1981 Bauer et al.

(Continued)

FOREIGN PATENT DOCUMENTS

| DE | 298 14 461 | 12/1998 |
|---|---|---|
| DE | 199 00 941 | 9/1999 |
| DE | 201 15 154 | 2/2002 |

(Continued)

OTHER PUBLICATIONS

English language International Preliminary Examination Report for International Application No. PCT/DE2003/001224, International Filing Date Apr. 8, 2003 for Brose Fahrzeugteile GmbH & Co. KG, Coburg.

Primary Examiner—Milton Nelson, Jr.
(74) Attorney, Agent, or Firm—Christie, Parker & Hale, LLP.

(57) ABSTRACT

A longitudinal guide rail for a motor vehicle seat. The rail includes two elongated guide rails that engage with one another and are displaceable in relation to one another in the longitudinal direction of the rails, a retaining bracket for a seatbelt buckle, which is fastened to one of the two guide rails, a slot that is provided in one of the guide rails, through which a fixing section of the retaining bracket is guided into a space enclosed by the two guide rails and a fixing point, at which the fixing section of the retaining bracket is connected to one of the guide rails. The fixing section when viewed from the longitudinal direction of the rails, extends beyond the slot and the fixing point, also viewed from the longitudinal direction of the rails, is located at a distance from the slot.

40 Claims, 10 Drawing Sheets

U.S. PATENT DOCUMENTS

| | | | |
|---|---|---|---|
| 4,722,573 A | * | 2/1988 | Komohara .................. 297/468 |
| 5,102,197 A | * | 4/1992 | Itsuki ........................ 297/468 |
| 5,125,611 A | * | 6/1992 | Cox .......................... 248/429 |
| 5,575,449 A | * | 11/1996 | Shinbori et al. ............ 248/429 |
| 5,641,145 A | * | 6/1997 | Droulon et al. ............. 248/429 |
| 6,299,252 B1 | | 10/2001 | Frohnhaus et al. |

FOREIGN PATENT DOCUMENTS

| DE | 201 15 164 | 3/2002 |
|---|---|---|
| WO | WO 02/074589 | 9/2002 |

* cited by examiner

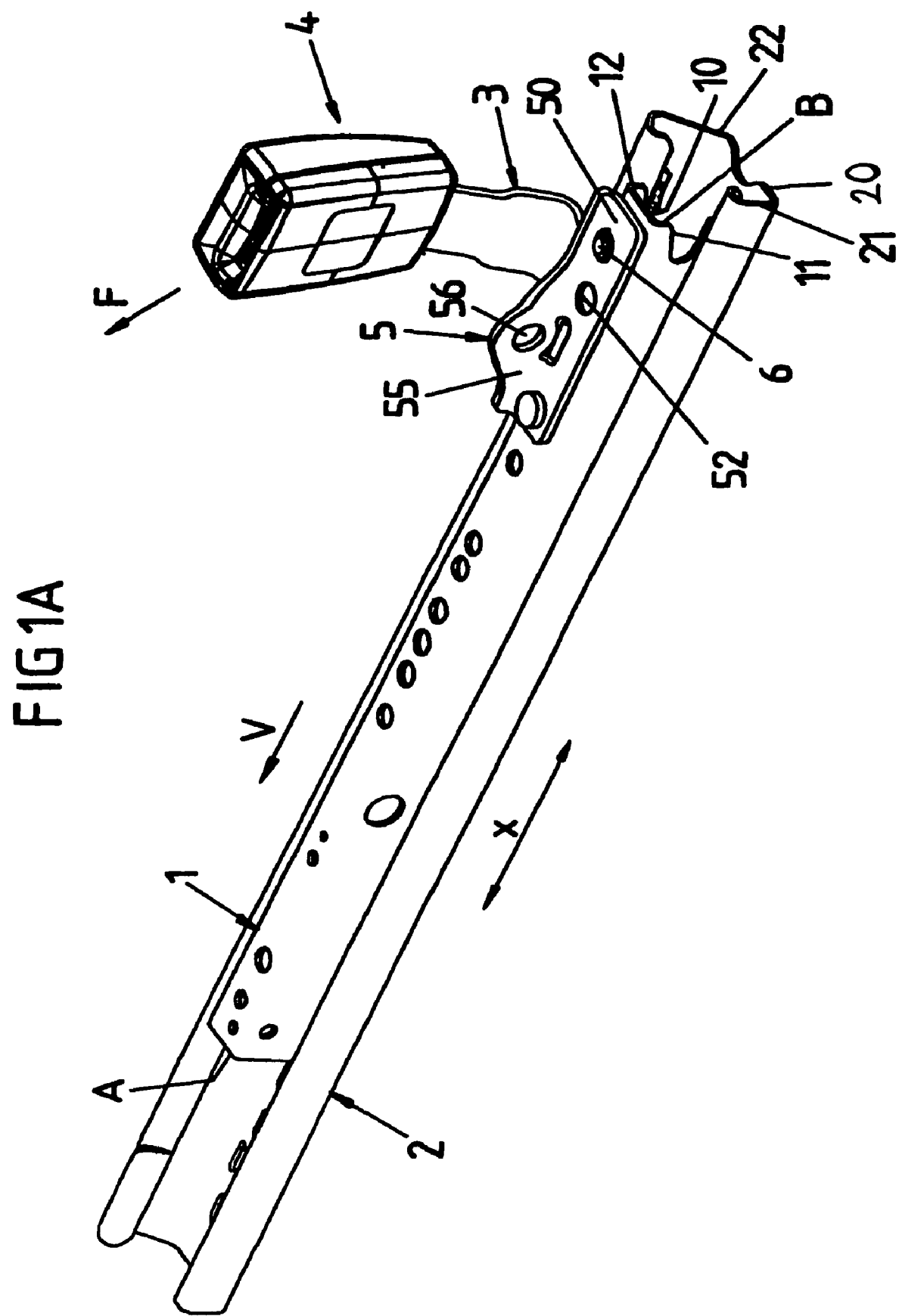

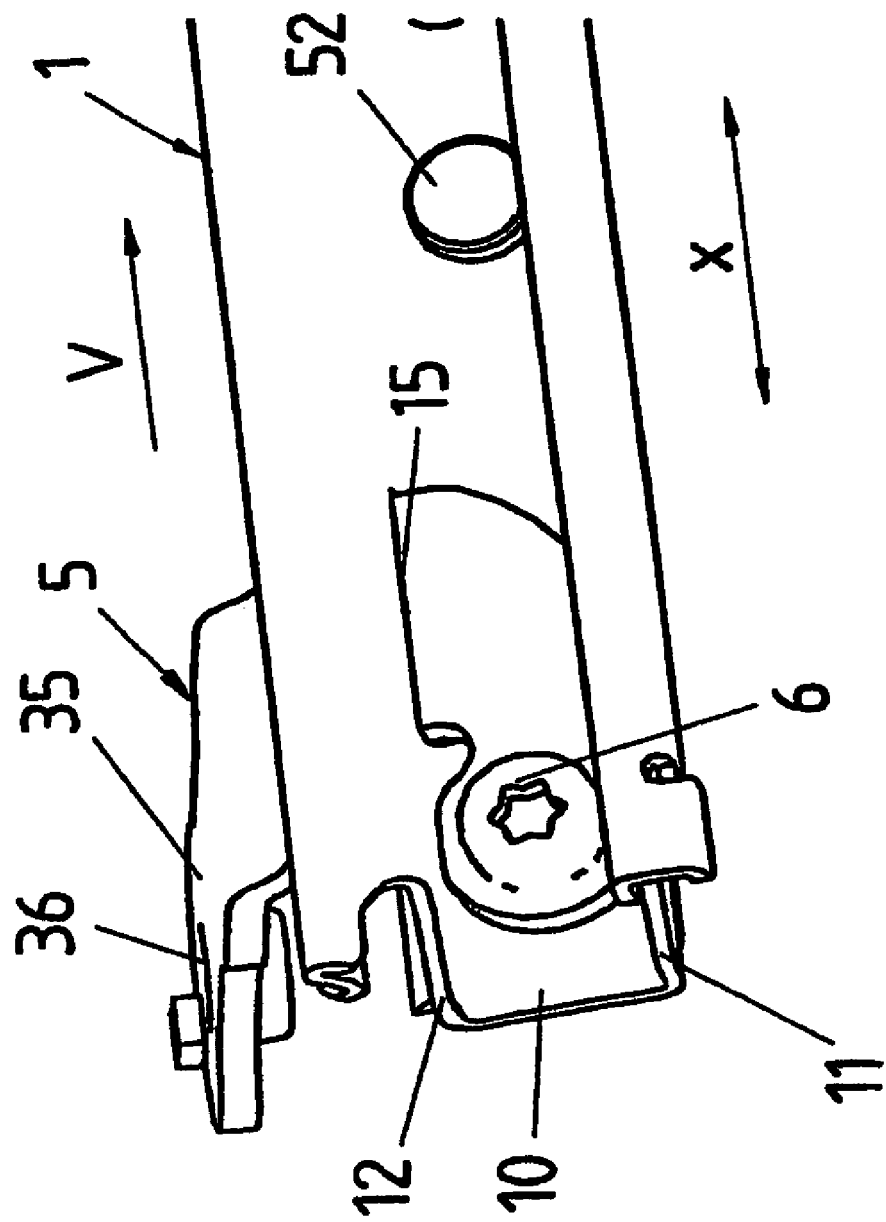

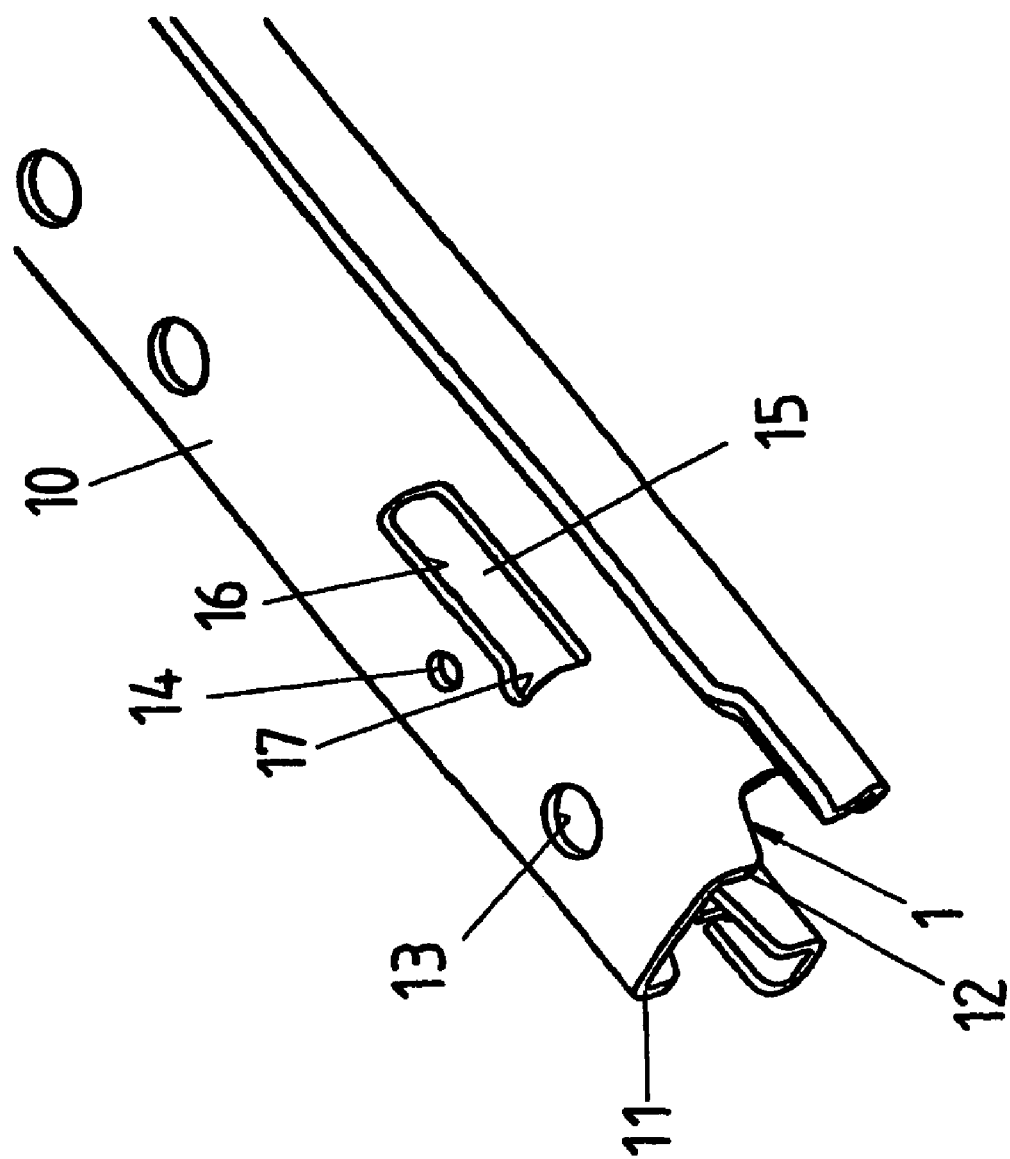

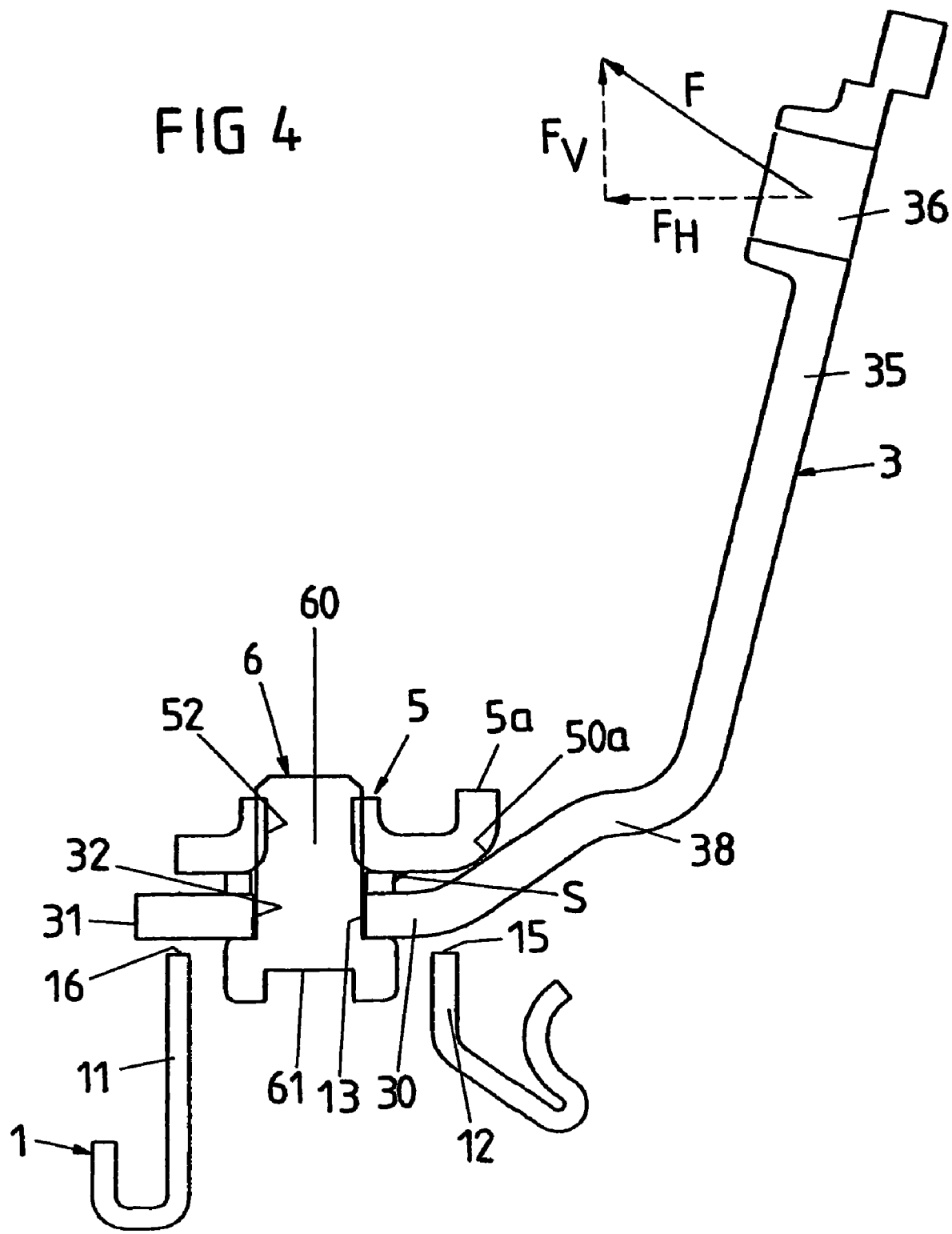

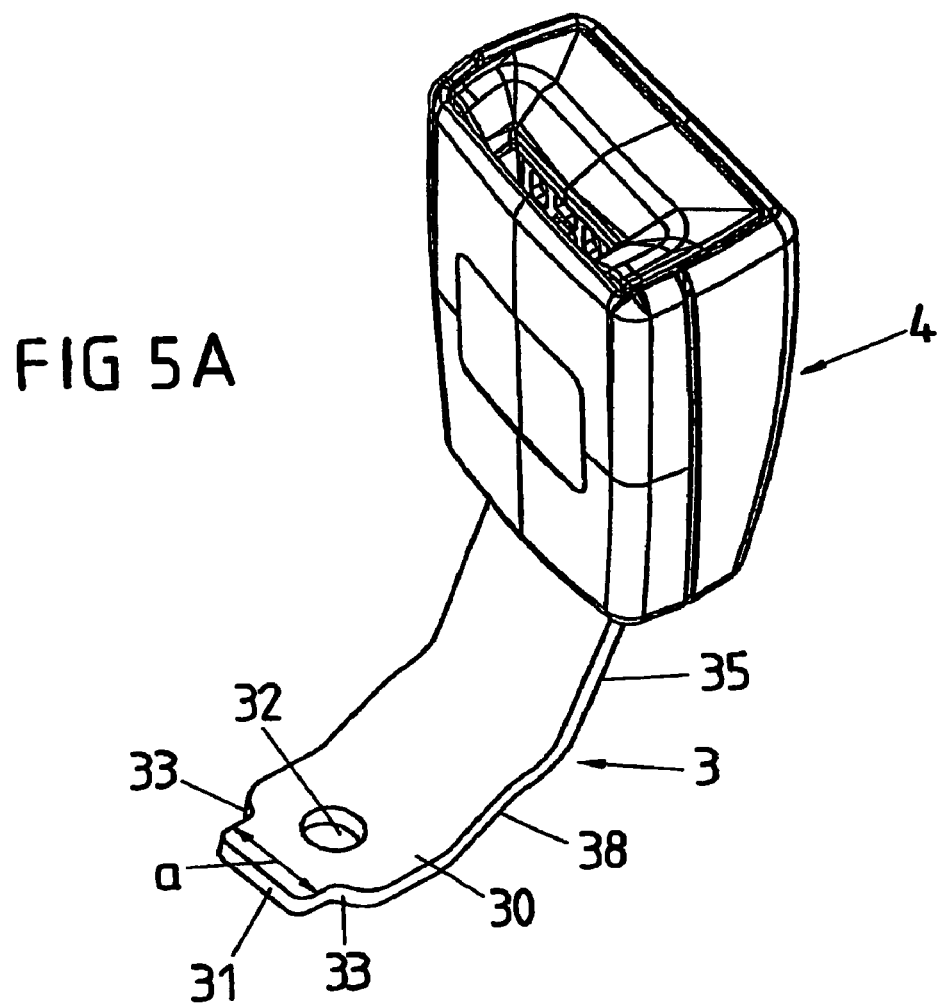
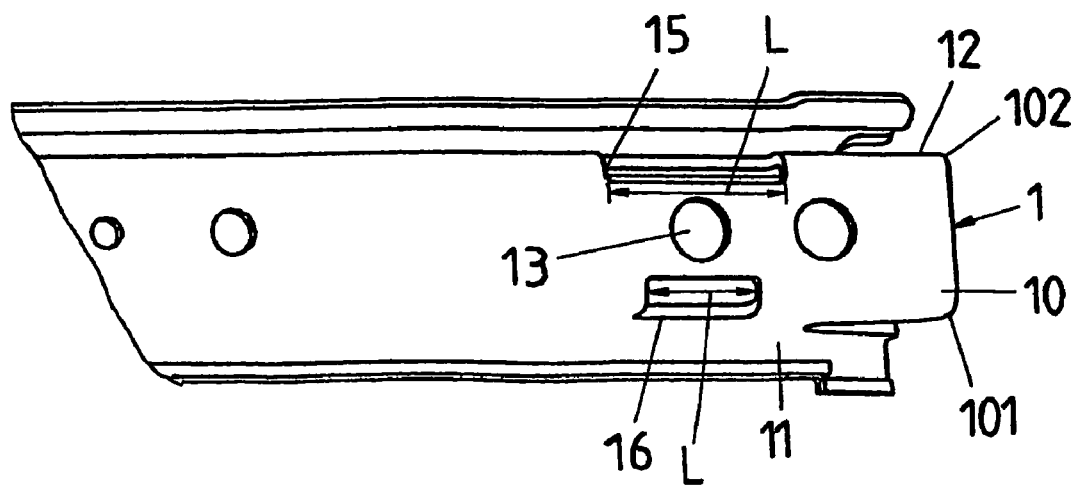

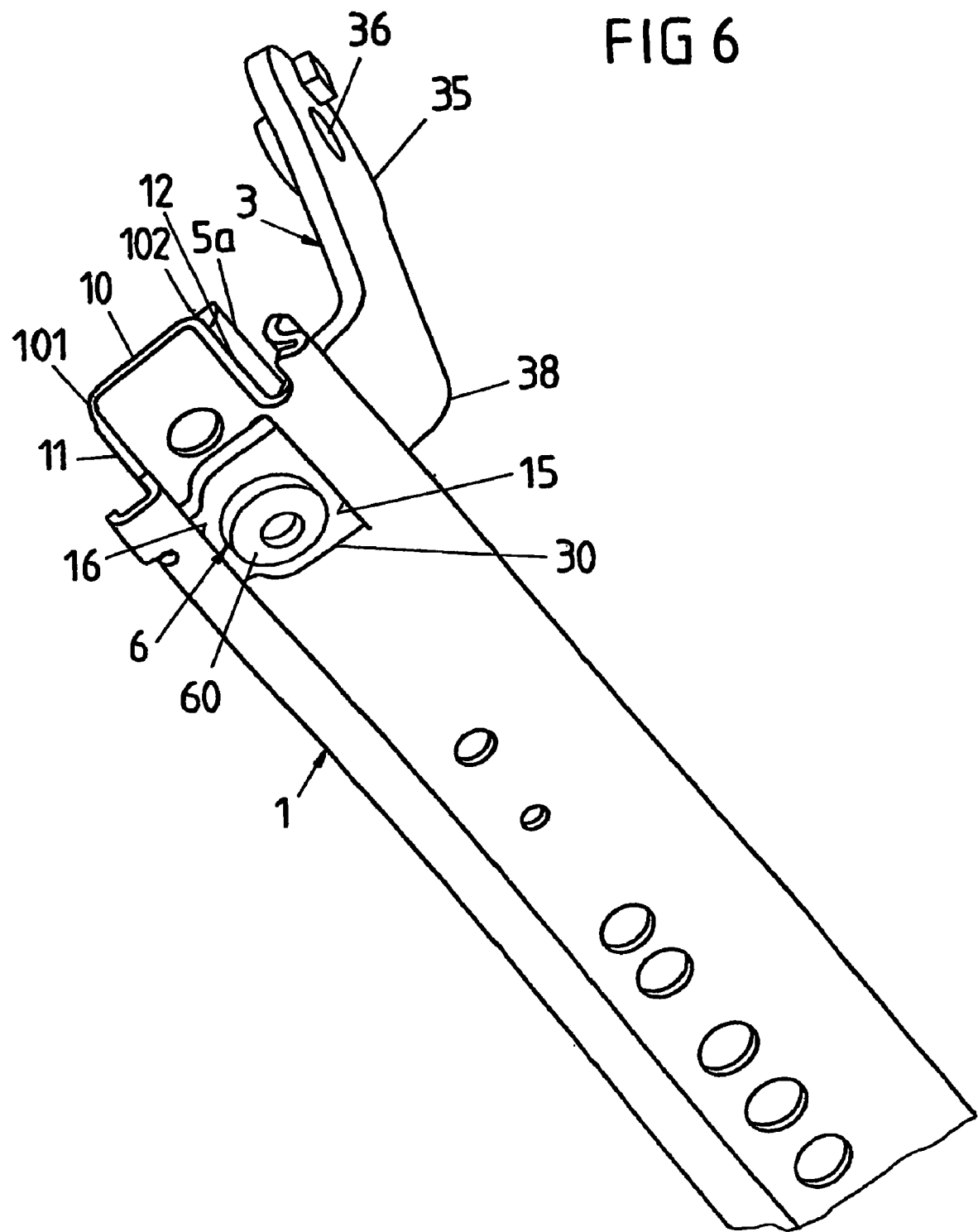

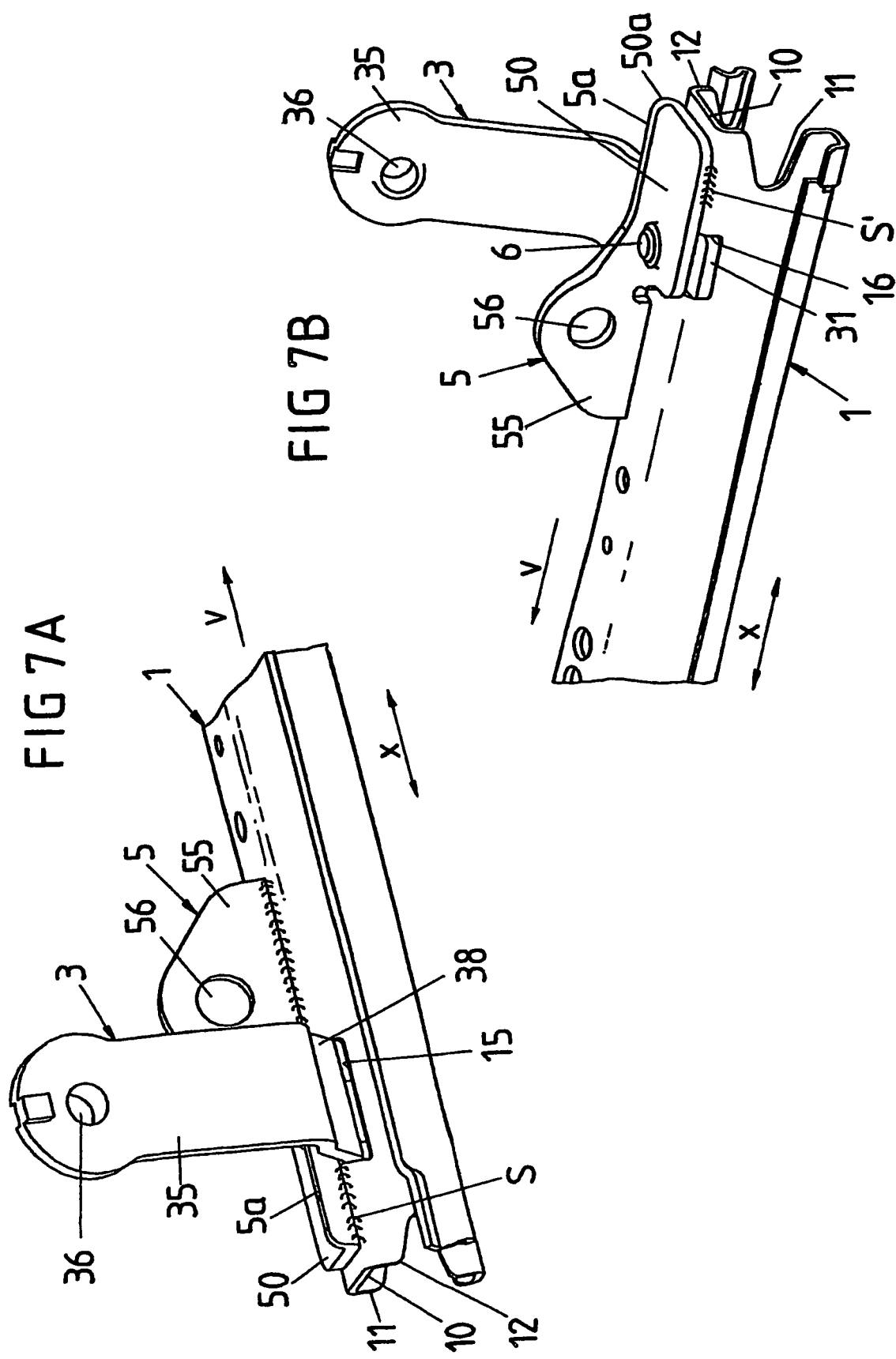

LONGITUDINAL GUIDE RAIL FOR MOTOR VEHICLE SEAT

CROSS-REFERENCE TO RELATED APPLICATION

This application is a National Phase Patent Application of International Application Number PCT/DE303/01224, filed on Apr. 8, 2003, which claims priority of German Patent Application Number 102 20 951.0, filed on Apr. 30, 2002; and German Patent Application Number 102 50 212.9, filed 24 Oct. 2002.

The invention relates to a longitudinal guide rail for a motor vehicle seat.

BACKGROUND

When fixing a seat belt buckle on a longitudinal guide rail for a motor vehicle seat there is the problem that in the event of a crash very large forces can act on the buckle when a vehicle occupant is restrained by a seat belt connected to this buckle. These forces have—in relation to a longitudinal guide rail for a vehicle seat installed in the vehicle—a component directed vertically upwards (perpendicular to the longitudinal guide rail) and a component directed inwards (perpendicular to the longitudinal guide rail and to the vertical), corresponding to the traction forces which act on the seat belt connected to the belt buckle as the belt restrains the occupant seated on the corresponding vehicle seat. Such forces can in particularly with serious accidents lead to the retaining bracket through which the belt buckle is fixed to the guide rail of the longitudinal guide becoming detached from the corresponding rail if the fixing points do not withstand the forces which arise.

SUMMARY

The object of the invention is to improve a longitudinal guide rail of the kind already mentioned so that the risk of the retaining bracket of the buckle becoming detached from the one guide rail of the longitudinal guide as a result of a crash is minimized.

A longitudinal guide rail of, this kind comprises two elongated guide rails which engage in each other and of which one is displaceable along the other in the longitudinal direction of the guide serving to adjust the longitudinal position of the motor vehicle seat; a retaining bracket for a seat buckle which is fixed on the one displaceable guide rail; a slot provided in the one guide rail through which a fixing section of the retaining bracket is guided into a space enclosed by the two guide rails; a fixing point at which the fixing section of the retaining bracket is connected to the one guide rail; as well as a force engagement point on the retaining section of the retaining bracket where the belt forces of a seat belt buckle fixed on the retaining bracket can engage (with a force component perpendicular to the longitudinal direction of the rail).

According to this the fixing section of the retaining bracket seen in the longitudinal direction of the rail extends over the slot in the one guide rail and the fixing point at which the fixing section of the retaining bracket is connected to the guide rail is spaced from the slot, viewed in the longitudinal direction of the rail.

This solution according to the invention has the advantage that the belt forces which arise in the event of crash are introduced through the belt buckle, the retaining bracket and its fixing section into a section of the one guide rail of the longitudinal guide which is spaced from the slot. The strain on the guide rail in the immediate vicinity of the slot is thereby reduced and the risk of the guide rail splitting in the region of the slot is minimized.

The main idea of the invention is thus that the introduction of the force from the retaining bracket into the associated guide rail is modified so that the strain in the region where the retaining bracket engages in the slot of the guide rail is clearly reduced so as to prevent the guide rail from splitting in the region of the slot.

In relation to the position of the longitudinal guide rail installed in a motor vehicle where the two guide rails have a front and rear end, seen in the drive direction (forward direction), the fixing point is spaced from the slot preferably towards the rear end of the one guide rail. It is hereby reached that the fixing point in the event of a crash is not loaded with compression forces but only with traction forces. A region of the fixing section extends in the longitudinal direction of the rail up to that fixing point spaced from the slot.

Furthermore an additional anti-rotation lock can be provided which is to prevent the fixing section and thus the retaining bracket as a whole from swiveling round the fixing point. For this the retaining angle can interact with the one guide rail at at least one point spaced from the fixing point in the longitudinal direction of the rail.

According to one embodiment a stop of the retaining bracket on a counter stop of the one guide rail acts as the anti-rotation lock. According to another embodiment apart from the actual fixing point there is an additional fixing means for connecting the retaining bracket and the one guide rail which can serve for example to produce a positive locking connection or a force-locking connection (screw or rivet connection).

The actual fixing point at which the fixing section of the retaining bracket is connected to the one guide rail can be formed for example by aligned fixing openings in the fixing section of the retaining bracket on the one side and in the one guide rail on the other side through which fixing members, e.g. a screw with an associated nut or rivet are passed.

The fixing point can furthermore serve to fix a further structural assembly e.g. a bearing block for a seat height adjuster on the one guide rail.

In order to prevent the slot from splitting under the effect of large crash forces the slot can have a free cut section at one end side.

The two guide rails of the longitudinal seat guide rail are each formed with a substantially U-shaped cross-section and have on their side arms guide and hooked regions through which the two guide rails engage in each other for longitudinal adjustment. A hollow space is hereby enclosed between the two guide rails. The fixing section of the retaining bracket is passed through the slot in the one guide rail into this hollow space. The slot is thereby preferably located in the transition region between the cross web and the one side arm of the corresponding U-shaped guide rail.

According to another aspect of the invention, a support element is fixed on the one guide rail so that the retaining bracket engages with the support element when this retaining section is moved in the direction of the belt force.

The solution according to the invention makes use of the fact that particularly large belt forces which arise in the event of a crash and which could lead to the slot splitting in the one guide rail also cause at the same time a deformation, more particularly bending of the retaining bracket so that the retaining section provided with the force engagement point (fixing point) for the belt buckle is moved in the direction of the belt forces which engage on the force engagement point. This movement of individual regions of the retaining bracket which is caused by the deformation is utilised to bring same into engagement with a support element fixed on the one guide rail. The support element then takes up the forces which act on the retaining bracket at least in part and thus prevent these forces from being introduced through the retaining bracket predominantly into the marginal region of the slot through which the fixing section of the retaining bracket engages and which could hereby split or cause the fixing section of the belt retaining bracket to split.

The support element can hereby be simply formed by a structural assembly which is fixed in any case for a different purpose on the one longitudinally displaceable rail of the longitudinal guide rail, e.g. through a bearing block provided for supporting a vehicle seat on the one guide rail.

The retaining bracket is normally designed so that it has next to the fixing section through which it is fixed on the one guide rail a retaining section angled therefrom which extends (upwards) substantially vertical to the longitudinal direction of the rail and has a fixing point for a belt buckle which forms at the same time the force engagement point for the belt forces.

The belt forces which occur in the event of a crash and which as a rule have an upwardly directed first force component perpendicular to the longitudinal direction of the rail as well as a second force component directed inwards perpendicular to the longitudinal direction of the rail consequently cause a type of swivel movement of the belt retaining bracket inwards (in relation to the state of the corresponding longitudinal seat guide installed in a vehicle) whereby the swivel movement is made possible by the belt retaining bracket bending, more particularly in the transition region between the retaining section and the fixing section.

The support element which is mounted on one surface of the one guide rail preferably projects in the direction of the retaining section of the retaining bracket over the side edge of the corresponding surface so that the retaining bracket in the event of a deformation caused by a crash can move into engagement with the laterally protruding region of the support element. A rounded region of the support element thereby preferably serves as a contact bearing for the retaining bracket. This hereby prevents the retaining section of the retaining bracket from moving into engagement with a sharp-edged region of the support element which could increase the risk of the retaining bracket splitting in its retaining section.

The rail of the longitudinal guide rail which houses the retaining bracket is preferably the top rail from which the retaining bracket projects upwards by its retaining section.

In order to fix the support element on the one guide rail in a further advantageous embodiment there is at least one welded seam (produced by laser welding) which extends at least along that longitudinal side of the support element which faces the retaining section of the retaining bracket. A special stability is hereby produced in respect of the forces which during deformation of the retaining bracket are exerted on the side of the support element facing the retaining bracket.

In order to fix the retaining bracket on the one guide rail through its fixing section there is at least one fixing element which engages through the fixing section of the retaining bracket, the guide rail as well as the support element. The fixing element is preferably a fixing screw which is screwed into an internal thread of the support element and whose head is mounted in the space enclosed by the guide rails. The structural space required for the fixing means for fixing the retaining bracket on the one guide rail is thereby minimized.

In a preferred development of the invention the retaining bracket is inserted by its fixing section into a slot in the form of a first free cut section of the one guide rail and projects by its end remote from the retaining section through a second free cut section of the guide rail which is mounted opposite the first free cut section perpendicular to the extension direction of the guide rail and which has in the extension direction of the guide rail a smaller extension than the first free cut section. The length of the second free cut section (extension in the longitudinal direction of the rail) is thereby selected so that the front free end of the fixing section of the belt retaining bracket is taken up with substantially an exact fit by the second free cut section. I.e. the extension of the second free cut section along the longitudinal direction of the rail corresponds to the extension of the free end of the fixing section housed therein in this direction.

This prevents the belt retaining bracket from turning which could lead to considerable strain on the first free cut section of the one guide rail.

Furthermore the fixing section of the belt retaining bracket has in the region of its free end remote from the retaining section at least one stop with which it bears against the edge of the second free cut section of the one guide rail whereby the insert depth of the fixing section is fixed.

The arrangements described, where a retaining bracket is not simply fixed on an outer surface of a guide rail of the longitudinal guide but is mounted through a slot in this guide rail by a fixing section in the inner space enclosed by the two rails of the longitudinal guide, prevents the retaining bracket from coming away from the guide rail. For the retaining bracket is indeed mounted in a hollow space enclosed by the two guide rails of the longitudinal guide and is thereby secured against coming away from the longitudinal guide. By using correspondingly stable materials or a corresponding wall thickness of the materials used it must hereby be ensured that even with very severe crash forces the guide rail of the longitudinal guide provided with the slot cannot split in the region of the slot or cause the retaining bracket to split. It is thus ensured that the fixing section of the retaining bracket of the buckle is housed securely between the two guide rails and cannot become detached from the associated guide rail.

BRIEF DESCRIPTION OF THE DRAWINGS

Further features and advantages of the invention will now be explained with reference to the embodiments of the invention illustrated in the drawings. They show FIG. 1a a perspective view of a longitudinal guide rail with a seat belt buckle fixed thereon through a retaining bracket;

FIG. 1c a view from below of the one rail of the longitudinal guide rail of FIG. 1a in the region of the retaining bracket of the belt buckle;

FIG. 2 a rear view according to FIG. 1b, but without any retaining bracket;

FIG. 4 a cross-section through a further longitudinal guide rail with a retaining bracket for a belt buckle mounted on a guide rail;

FIG. 5a a perspective view of the retaining bracket of FIG. 4 with a belt buckle fixed thereon;

FIG. 5b a perspective plan view of that guide rail of the longitudinal guide on which the retaining bracket is to be mounted with the belt buckle;

FIG. 6 a perspective view from below of the one guide rail of the longitudinal guide with the retaining bracket mounted thereon for a belt buckle;

FIGS. 7a/7b two different perspective views of the one rail of the longitudinal guide rail with the belt buckle mounted thereon and with a bearing block mounted on the rail;

DETAILED DESCRIPTION

Figure 1B:
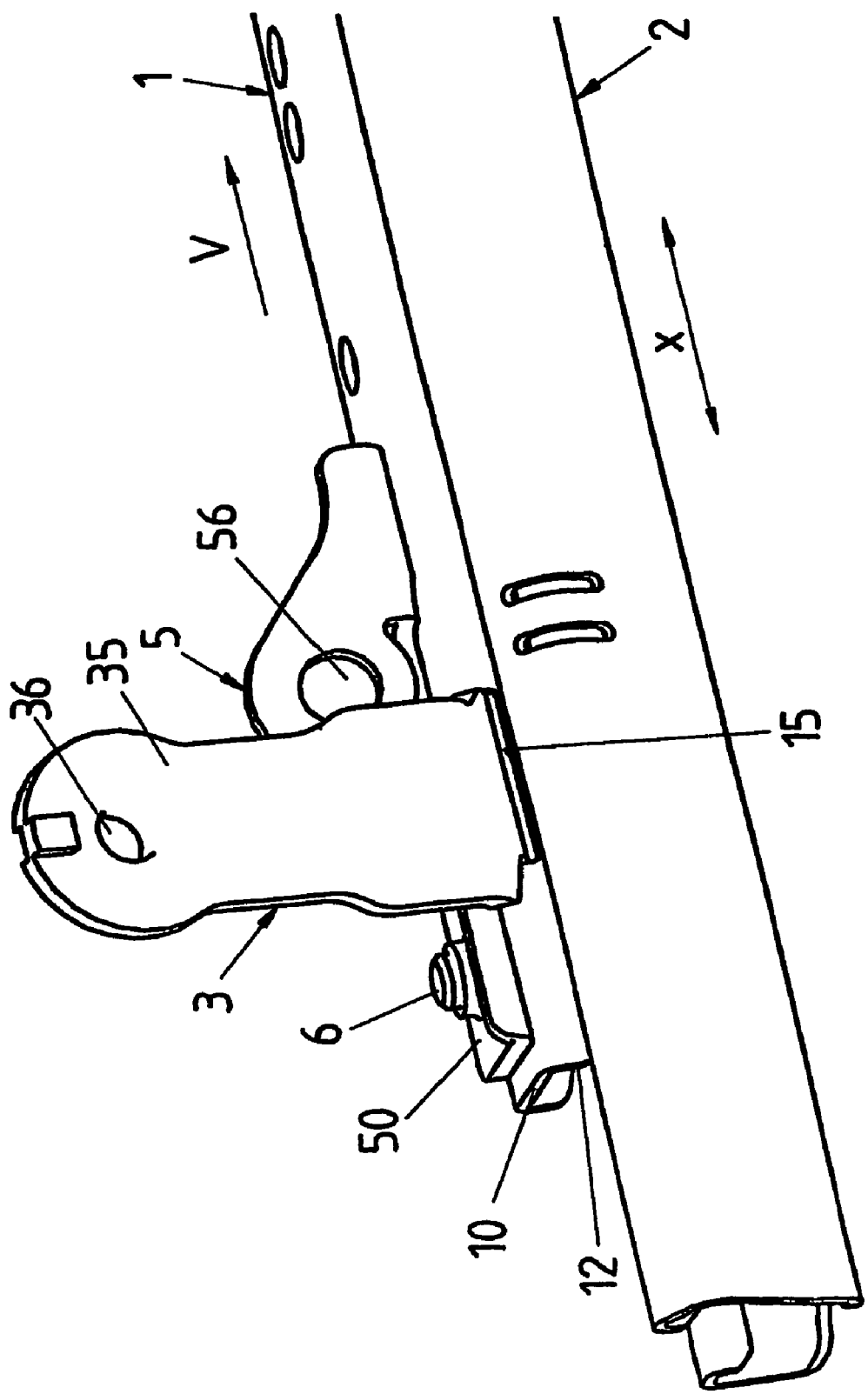
FIG. 1b a rear view of the longitudinal guide rail of FIG. 1a in the region of the retaining bracket of the buckle.

FIGS. 1a to 3 show a longitudinal guide rail for a motor vehicle seat which consists of an upper rail 1 of substantially U-shaped cross-section and a lower rail 2 likewise of a substantially U-shaped cross-section. The two guide rails 1, 2 each have on their side arms 11, 12 and 21, 22 guide and hooked regions along which the two guide rails 1, 2 engage with each other for longitudinal displacement. The guide rails 1, 2 thereby form with their base regions 10 and 20 as well as their side arms 11, 12 and 21, 22 an elongated hollow space which is enclosed by the guide rails 1, 2.

The one guide 1 serves as the upper rail (seat-side rail) to hold the lower seat base of the motor vehicle seat and is mounted longitudinally displaceable in the other guide rail 2 which is designed as the lower rail and is to be mounted secured on the bodywork. Normally a guide rail 1, 2 of the type illustrated in FIG. 1a is mounted on each longitudinal side of the motor vehicle seat.

The connection between the seat base of the vehicle seat and the one guide rail (seat-side rail) of the longitudinal guide rail 1, 2 is as a rule through an articulated lever assembly by means of which the base can be adjusted in height relative to the longitudinal guide rail 1,2 (setting the seat height). To connect a lever assembly of this kind to the seat-side rail 1 of the longitudinal guide rail a bearing block 5 is provided in accordance with FIG. 1a which rests by a base surface 50 on the seat-side rail and is fixed thereon and which has a bearing section 55 protruding at an angle, more particularly substantially at a right angle, from the base surface 50 with a bearing bore 56 for an adjustment lever.

In relation to the drive direction or forward direction V of the longitudinal guide rail 1, 2 extending in the longitudinal direction x of the vehicle the bearing block 5 is mounted in the region of the rear end of the guide rail 1 on the seat side. A retaining bracket 3 is furthermore fixed there which supports a buckle 4 of a seat belt assembly. The fixing of the retaining bracket 3 on the seat-side rail 1 of the longitudinal guide rail 1, 2 will now be described in more detail with reference to FIGS. 1a to 3.

The retaining bracket 3 has a fixing section 30 for fixing the retaining bracket 3 on the seat-side rail 1 and a retaining section 35 which protrudes at an angle therefrom, more particularly at a right angle therefrom and has a fixing opening 36 for the belt buckle 4. Very large forces F can act on this in the event of a crash when a vehicle occupant is restrained by the corresponding seat belt. These forces are directed inclined from the front upwards at an angle to the longitudinal axis x of the vehicle and are introduced from the belt buckle 4 through the retaining bracket 3 into the seat-side rail 1 of the longitudinal guide rail 1, 2. It is therefore important to fix the retaining bracket 3 on the seat-side rail 1 so that it cannot become detached therefrom even under the action of very large forces.

To this end the fixing section 30 of the retaining bracket 3 is here passed through a slot 15 which extends in the region of the rear end of the seat-side rail 1 in the longitudinal direction x of the vehicle, namely in the transition region between the base surface 10 and the one angled arm 12 of the seat-side rail 1. The fixing section 30 of the retaining bracket 3 thereby lies not simply on the seat-side rail, like the bearing block 5, but is rather mounted in the hollow space formed by the two guide rails 1, 2 beneath the base surface 10 of the seat-side rail 1. Through the belt forces F which act in the event of a crash the fixing section 30 of the retaining bracket 3 is forced from below against the base surface 10 of the seat-side rail 1 so that the force is introduced over a large surface area from the fixing section 30 of the retaining bracket 3 into the base surface 10 of the rail 1 on the seat side. Unlike those arrangements where the retaining bracket 3 rests by its fixing section 30 on the base surface 10 of the seat-side guide rail 1 and the force is introduced into the seat-side rail 1 only through the corresponding fixing means, here there is a clearly lower risk that the retaining bracket 3 comes away from the rail 1 on the seat side.

The risk of the retaining bracket 3 coming away from the rail 1 on the seat side would then only exist if the seat-side rail 1 splits as a result of the forces introduced through the retaining bracket 3 in the region of the slot 15 which serves to insert the fixing section 30 of the retaining bracket 3. In order to avoid this the fixing section 30 of the retaining bracket 3 has a projection 31 which extends in the longitudinal direction x of the vehicle into a direction towards the rear end B of the seat-side rail 1 (thus opposite the drive or forward direction V). At this projection 31 of the fixing section 3 there is a fixing opening 32 through which the retaining bracket 31 is to be fixed against the rail 1 on the seat side for which the latter has a corresponding fixing opening 13 in the region of its rear end B.

The two fixing openings 13, 32 thus form a fixing point which serves to fix the retaining bracket 3 against the base surface 10 of the seat-side rail 1 through the projection 31 of its fixing section 30. The fixing openings 13, 32 are associated here with a fixing means 6 in the form of a fixing screw with associated nut. Alternatively other fixing means could also be used, such as for example a fastening rivet.

It can clearly be seen from FIGS. 1a to 3 that the fixing point formed by the fixing openings 13, 32, seen in the longitudinal direction x of the vehicle (rail longitudinal direction ) is arranged spaced from the slot 15, namely in the direction opposite the drive or forward direction V. In other words, seen from the front end A of the rail 1 on the seat-side the fixing point 13, 32 is located behind the slot 15, and viewed from the rear end B of the seat-side rail 1 in front of the slot 15.

Through the design described above of the fixing section 30 of the retaining bracket 3 and the arrangement of the fixing point 13, 32 spaced from the slot 15 in the longitudinal direction x of the rail it is achieved that belt forces F arising in the event of a crash are introduced not only into the region of the guide 1 on the seat side, in which the slot 15 extends in the longitudinal direction x of the vehicle, but also more particularly in a region behind the guide rail 1 on the seat side which compared with the slot 15 lies closer to the rear end B of the guide rail 1. The risk of the slot 15 splitting under the action of the belt forces F introduced into the rail 1 on the seat side is considerably reduced.

Figure 3:
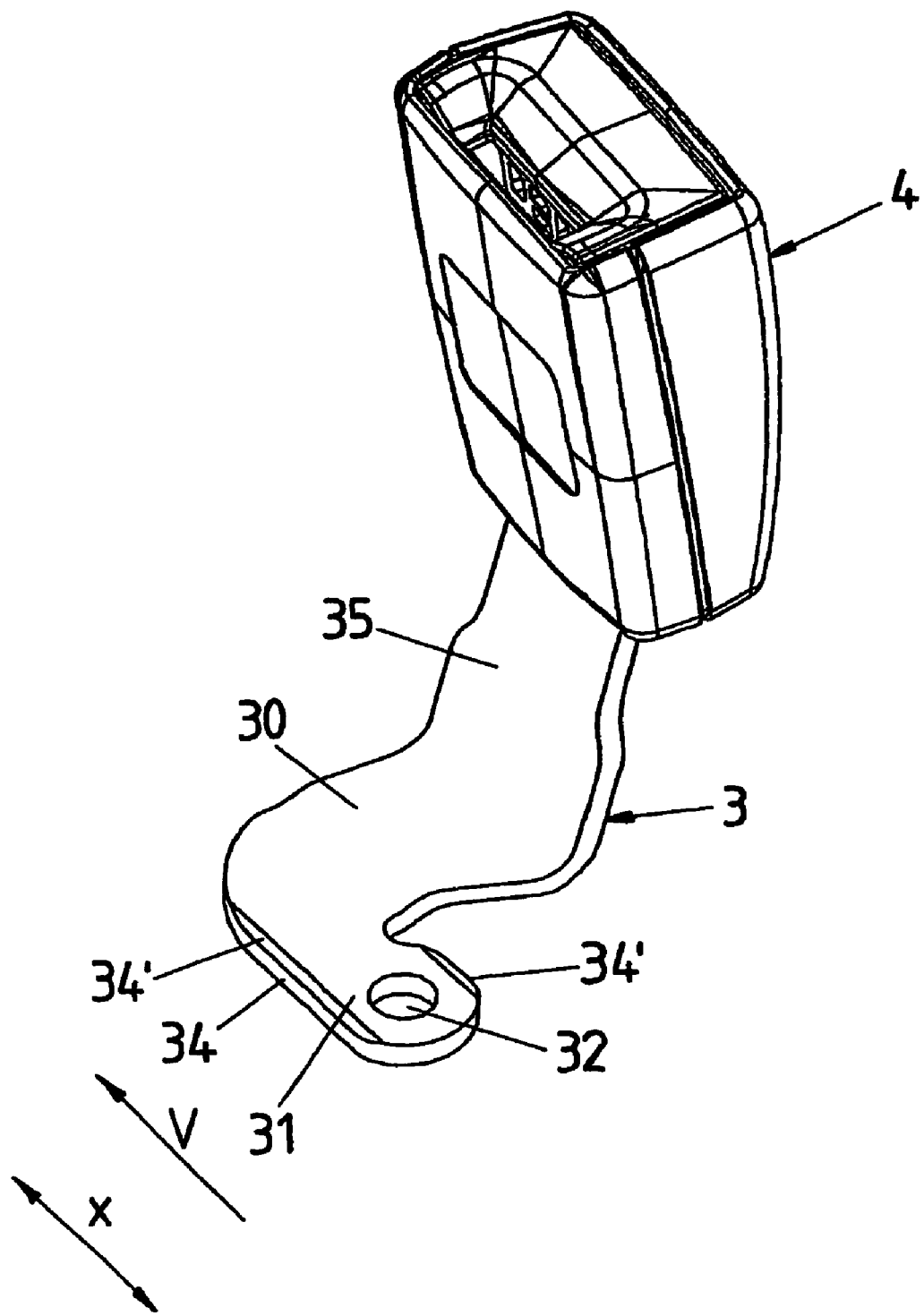
FIG. 3 a perspective view of the seat belt buckle of FIG. 1a with the associated retaining bracket.
Figure 8:
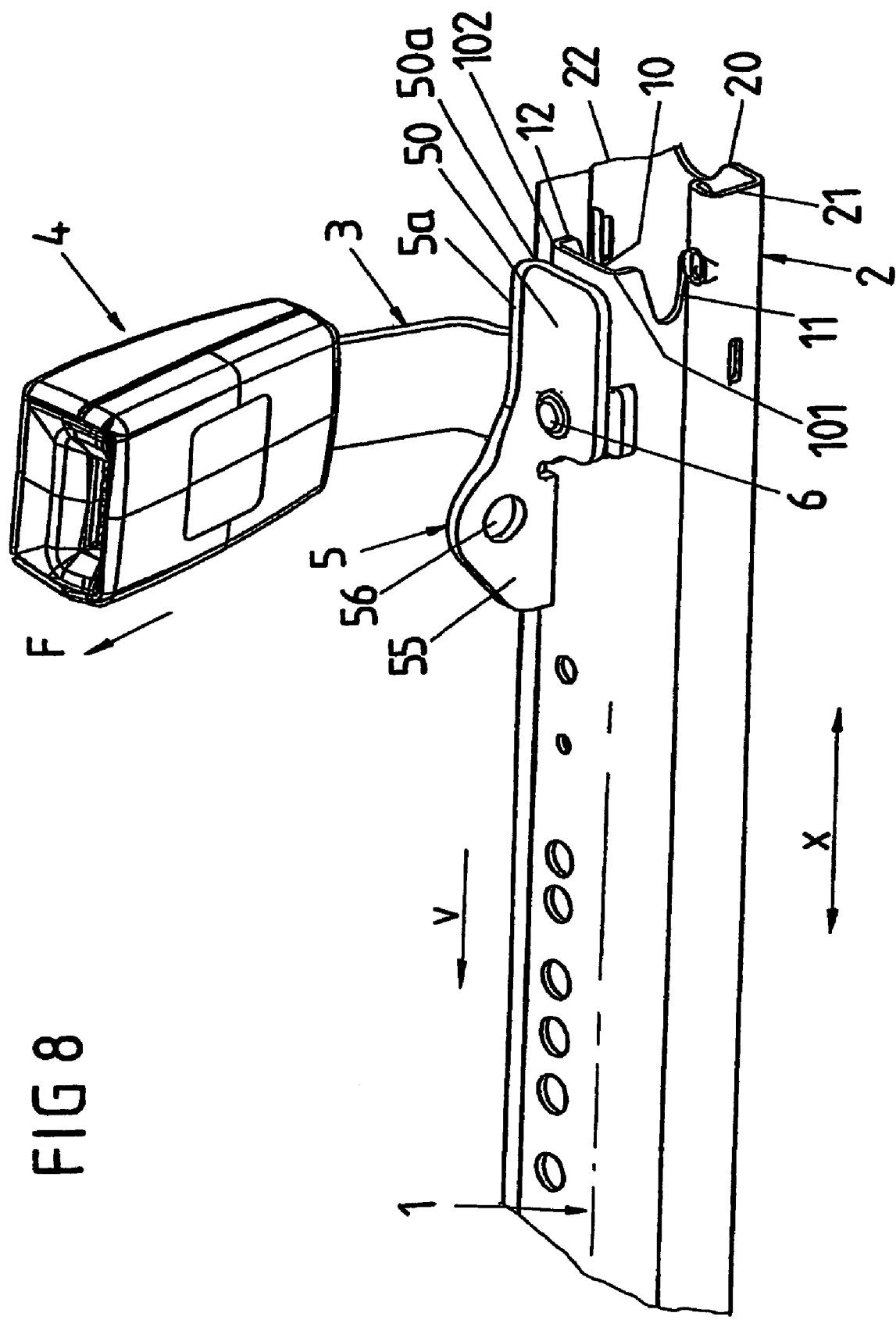
FIG. 8 a further perspective view of the arrangement of FIGS. 7a and 7b together with the second rail of the longitudinal guide rail.

According to FIG. 3 an inclined edge 34 (with taper 34') extends on two opposite side edges of the fixing section 30 running in the longitudinal direction x of the vehicle and in particular of its projection 31 and in the installed state of the retaining bracket is supported on each inside face of the seat-side rail 1, namely on that inner face which lies in the transition region between the base surface 10 and the two angled arms 11, 12. The edge 34 of the fixing section 30 thus act as stops which are supported on corresponding inner counter stops of the rail 1 on the seat side and which thereby counteract turning of the retaining bracket 3 under the action of the forces which arise in the event of a crash.

Alternatively or additionally a further fixing point could be provided through which the fixing section 30 of the retaining bracket 3 is fixed on the rail 1 on the seat side and which is spaced in the longitudinal direction of the vehicle from the aforementioned first fixing point 13, 32, see here the further fixing point 14 which is shown in FIG. 2 and is provided next to the slot 15 in the base surface 10 of the guide rail 1 on the seat side. This also prevents the retaining bracket 3 from rotating about its first fixing point 13, 32.

It can furthermore be seen in FIG. 2 that the slot 15 has on an end side a free cut section 17 in order to minimize the effects of notches and to prevent the guide rail 1 on the seat side from splitting in the region of the slot 15.

Finally it can be seen from FIG. 1a that the same fixing means, more particularly the fastening screw 6 mentioned above, which serve to fix the retaining bracket 3 on the guide rail 1 on the seat side, can also be used at the same time to fix the bearing block 5 on the guide rail 1. FIG. 1a furthermore shows a central fixing opening 52 of the bearing block 5 which is not used for fixing but which aligns with the additional fixing opening 14 shown in FIG. 2 in the guide rail 1 on the seat side and which can serve to form a fixing point for an additional anti-rotational lock.

FIGS. 4 to 8 show a longitudinal guide rail for a motor vehicle seat which consists of a first guide rail 1 with a substantially U-shaped cross-section in the form of a top rail and a second guide rail 2 which likewise has a substantially U-shaped second guide rail 2 in the form of a bottom rail.

The fixing of the retaining bracket 3 against the seat-side rail 1 of the longitudinal guide rail 1, 2 will now be described in more detail with reference to FIGS. 4 to 8.

The retaining bracket 3 has a fixing section 30 for fixing the retaining bracket 3 against the rail 1 on the seat side and a retaining section 35 which is angled therefrom, preferably at a right angle therefrom, with a fixing opening 36 for a belt buckle 4. In the event of a crash very large forces F can act on this when the vehicle occupant is restrained by the corresponding seat belt. These forces have—in relation to the state of the longitudinal guide rail 1, 2 installed in the motor vehicle—a component $F_V$ running upwards perpendicular to the longitudinal direction x of the rail (vertical component) as well as a component $F_H$ directed inwards perpendicular to the longitudinal guide rail (horizontal component), see in particular FIG. 4. Furthermore there is also a component along the longitudinal direction x of the rail, see in particular FIG. 8. These forces are introduced from the belt buckle 4 through the retaining bracket 3 into the seat-side rail 1 of the longitudinal guide rail 1, 2. It is therefore important to arrange and fix the retaining bracket on the seat-side rail 1 so that it cannot become detached therefrom even under the effect of very large forces. For if the retaining bracket 3 comes away from the associated rail 1 on the seat side then the seat belt would lose its function of restraining the corresponding vehicle occupant (restraint action).

In order to fix the retaining bracket 3 on the seat-side rail 1 the fixing section 30 of the retaining bracket 3 is passed through a slot 15 which extends in the region of the rear end of the seat-side rail 1 with a defined length L in the longitudinal direction x of the vehicle, namely in the transition region from the base surface 10 extending between two side edges 101, 102 to the one angled arm 12 of the seat-side rail 1. The fixing section 30 of the retaining bracket 3 mounted in the hollow space enclosed by the two guide rails 1, 2 has a fixing opening 32 which aligns with an associated fixing opening 13 of the seat-side rail 1 and an internally threaded passage 52 on the base surface 50 of the bearing block 5. The two openings 32, 13 as well as the passage 52 have a fixing screw 6 passing through whose shaft 60 which has an external thread is screwed into the internal thread of the passage 52 of the bearing block 5. The retaining bracket 3 and the bearing block 5 are connected at a fixing point to the base surface 10 of the seat-side rail 1 whereby the fixing section 30 of the retaining bracket 3 is mounted on one side (the bottom side) and the base surface 50 of the bearing block 5 on the other side (the top side) of the base surface 10 of the seat-side rail 1. The head 61 of the fixing screw 6 is located inside the hollow space enclosed by the guide rails 1, 2 so that the connection of the component parts is produced overall with the minimum space requirement.

In the end the fixing section 30 of the retaining bracket 3 does not simply rest on the rail 1 on the seat side, like the bearing block 5, but is rather mounted in the hollow space formed by the two guide rails 1 2 underneath the base surface 10 of the rail 1 on the seat side. Through the belt forces F which act in the event of a crash the fixing section 30 of the retaining bracket 3 is then pressed from below against the base surface 10 of the rail 1 on the seat side so that the force from the fixing section 30 of the retaining bracket can be introduced over a large surface area into the base surface 10 of the seat side rail 1. As opposed to those arrangements where the retaining bracket 3 rests by its fixing section 30 on the base surface 10 of the seat-side guide rail 1 and the force is introduced into the seat-side rail 1 only over the corresponding fixing means, through the arrangement of the fixing section 30 of the retaining angle 3 in the hollow space enclosed by the guide rails 1, 2 there is a clearly lower risk that the retaining bracket 3 could come away from the seat-side guide rail 1.

The danger of the retaining bracket 3 tearing away from the seat-side rail 1 would only then exist if the seat-side rail as a result of the forces introduced through the retaining bracket 3 splits in the region of the slot 15 serving to introduce the fixing section 30 of the retaining bracket 3 or if the fixing section 30 of the retaining bracket 3 split by interacting with the edge of the slot 15 of the seat-side rail.

In order to prevent this on the one side the fixing section 30 of the retaining bracket 3 is guided with its front end 31 remote from the retaining section 35 into a further slot 16 of the seat-side rail 1. This further slot 16 lies transversely to the longitudinal direction x of the rail opposite the first slot 15 at the transition between the base surface 10 of the seat-side rail 1 and the other side arm 11. The further slot 16 has in the longitudinal direction x of the rail a smaller extension L (length) than the opposite first slot 15. The length L of the further slot 16 in the longitudinal direction x of the rail is selected so that it corresponds to the extension a of the front free end of the retaining section 30 in this direction. The front free end 31 which is set back from the retaining section 30 by means of two shoulders 33 thus sits substantially with a close fit (seen in the longitudinal direction x of the rail) in the further slot 16. This prevents the fixing section 30 from turning in the first slot 15 as a result of the forward directed components of the belt force F which could lead to the first slot 15 or the fixing section 30 of the retaining bracket 3 splitting. The stops 33 formed on the shoulders of the fixing section 30 of the retaining bracket 3 at the transition to the free end 31 thereof thereby restrict the insert depth of the fixing section 30 of the retaining bracket 3 in the two slots 15, 16 in that the shoulders 33 bear against the edge of the further slot 15.

Furthermore the bearing block 5 forms on a region projecting sideways beyond an edge 102 (facing the retaining section 35 of the retaining bracket 3) of the base surface 10 of the seat side rail 1 a support element 5a with which the retaining bracket 3 can engage in the event of a deformation caused by crash forces. More precisely a rounded section 50a of the support element 5a serves for this which extends here next to the one side arm 12 of the seat-side rail 1 (on the side of the seat-side rail facing the retaining section 35 of the retaining bracket 3). If, as a result of a crash, belt forces F act on the retaining section 35 of the retaining bracket 3 having a vertical component $F_V$ and a horizontal component $F_H$ then the retaining bracket 3 is hereby deformed so that it bends in the direction of the belt forces F. This corresponds substantially to a pivotal movement of the retaining section 35 of the retaining bracket 3 through deformation of the transition region 38 between the retaining section 35 and the fixing section 30 of the retaining bracket 3 about an axis running along the longitudinal direction x of the rail. With this movement the transition section 38 between the fixing section 30 and retaining section 35 of the retaining bracket 3 moves into contact with the rounded region 50a of the support element 5a which is provided on the bearing block 5. This hereby prevents the horizontal and vertical components $F_H$ and $F_V$ of the belt force F leading to introduction of force from the retaining bracket 3 into the seat-side rail 1 through the fixing section 30 and the edge of the associated slot 15 of the seat-side rail 1.

For this could result in the slot 15 or the fixing section 30 splitting. As a result of the arrangement illustrated in FIGS. 4 to 8 the corresponding forces are rather introduced to a considerable part from the retaining bracket 3, more particularly its transition section 38 into the support element 5a of the bearing block 5. From there they are then diverted into the seat-side rail 1.

In order to prevent the bearing block 5 and thus the support element 5a from becoming detached from the seat-side rail 1 as a result of particularly strong crash forces, the bearing block 5 is additionally connected through welded seams S, S' by means of laser welding to the base surface 10 of the seat-side rail 1. The one welded seam S thereby extends in particular along the entire longitudinal side of the bearing block 5 facing the retaining section 35 of the retaining bracket 3. An additional welded seam S' is provided on the other longitudinal side of the bearing block 5.

As a result the first slot 15 is prevented from tearing through interaction with the fixing section 30 of the retaining bracket on the one hand—regarding the component of the belt forces F acting in the longitudinal direction x of the rail—in that the fixing section 30 is fitted precisely with its front end 31 (seen in the longitudinal direction x of the rail) in a further slot 16 of the seat-side rail 1. Regarding the force components $F_H$, $F_V$ of the belt force F directed perpendicular to the rail longitudinal direction x, splitting of the slot 15 or the fixing section 30 of the retaining bracket 3 interacting therewith is prevented in that a section 38 of the retaining bracket 3 engages under the action of the said force components (deforming) with a rounded region 50a of a support element 5a which is fixed on the seat-side rail 1 and protrudes sideways beyond same so that the forces are mainly introduced into this support element 5a or the bearing block 5 formed integral with the support element 5a and from there pass into the rail 1 on the seat side.

The invention claimed is:

1. A longitudinal guide rail for a motor vehicle seat with two elongated inter-engaging guide rails of which one is displaceable along the other in a longitudinal direction of the rail,
a retaining bracket for a seat belt buckle which is fixed on the one displaceable guide rail,
a slot provided in the one guide rail that receives a fixing section of the retaining bracket, the fixing section located in a space enclosed by the two guide rails,
at least one fixing point at which the fixing section of the retaining bracket is connected to the one guide rail, and
a force engagement point on a retaining section of the retaining bracket at which belt forces of a belt buckle fixable on the retaining bracket engage,
wherein the fixing point is spaced from the slot, viewed in the longitudinal direction of the rail and the fixing section viewed in the longitudinal direction of the rail extends beyond the slot up to the fixing point.

2. The longitudinal guide rail according to claim 1, wherein the one guide rail has in relation to a drive direction of a motor vehicle a front end and a rear end and that the fixing point is spaced from the slot in the direction of the rear end of the one guide rail.

3. The longitudinal rail guide according to claims 1 or 2, wherein a region of the fixing section extends in the longitudinal direction of the rail up to the fixing point.

4. The longitudinal guide rail according to claim 1, wherein the slot extends in the longitudinal direction of the rail.

5. The longitudinal guide rail according to claim 1, wherein an anti-rotation lock is provided to prevent the retaining bracket from turning about the fixing point.

6. The longitudinal guide rail according to claim 5, wherein the anti-rotation lock is formed by the interaction between the retaining bracket and the one guide rail.

7. The longitudinal guide rail according to claim 6, wherein a point at which the retaining bracket and the guide rail interact is spaced from the fixing point in the longitudinal direction of the rail.

8. The longitudinal guide rail according to claim 5, wherein a stop of the retaining bracket interacts with a counter stop of the one guide rail to provide the anti-rotation lock.

9. The longitudinal guide rail according to claim 5, wherein apart from the fixing point there is an additional fixing means for connecting the retaining bracket to the one guide rail.

10. The longitudinal guide rail according to claim 1, wherein the fixing point is formed by corresponding fixing openings in the retaining bracket and in the one guide rail and that a fixing member passes through the fixing openings.

11. The longitudinal guide rail according to claim 1, wherein the fixing point serves to fix a further structural assembly.

12. The longitudinal guide rail according to claim 11, wherein the further structural assembly comprises a bearing block for a seat height adjuster on the one guide rail.

13. The longitudinal guide rail according to claim 1, wherein the one guide rail is formed with a substantially U-shaped cross-section and that the slot extends in the region of the transition between a base surface of the one guide rail and an arm of the one guide rail.

14. The longitudinal guide rail according to claim 1, wherein the slot has a free cut section in order to counteract the guide rail splitting starting from the slot when larger forces appear on the retaining bracket.

15. A longitudinal guide rail for a motor vehicle seat with
two elongated inter-engaging guide rails of which one is displaceable along the other in a longitudinal direction of the rail,
a retaining bracket for a belt buckle which is fixed on the one displaceable guide rail,
a slot provided in the one guide rail that receives a fixing section of the retaining bracket, the fixing section located in a space enclosed by the two guide rails,
at least one fixing point on which the fixing section of the retaining bracket is connected to the one guide rail, and
a force engagement point on a retaining section of the retaining bracket at which belt forces of a belt buckle fixable on the retaining bracket engage, with a force component perpendicular to the longitudinal direction of the rail,
wherein a support element is mounted on the one guide rail and is fixed so that the support element protrudes beyond a side edge of a surface of the one guide rail in a direction of the retaining bracket and the retaining bracket engages with the support element when the retaining section is moved in a direction of the belt forces.

16. The longitudinal guide rail according to claim 15, wherein the retaining section is angled from the fixing section of the retaining bracket.

17. The longitudinal guide rail according to claims 15 or 16, wherein the retaining section extends along a direction which runs substantially perpendicular to the longitudinal direction of the rail.

18. The longitudinal guide rail of claim 15, wherein means are provided to counteract turning of the fixing section of the retaining bracket about an axis perpendicular to the longitudinal direction of the rail.

19. The longitudinal guide rail according to claim 15, wherein the belt forces have a first component and a second force component which run perpendicular to each other and which each run perpendicular to the longitudinal direction of the rail.

20. The longitudinal guide rail according to claim 15, wherein the retaining section as a result of the belt forces executes a swivel movement.

21. The longitudinal guide rail according to claim 20, wherein the swivel movement is produced through the retaining bracket bending under the action of the belt forces.

22. The longitudinal guide rail of claim 20, wherein the swivel movement is about the longitudinal direction of the rail.

23. The longitudinal guide rail according to claim 15, wherein the support element projects in the direction of the retaining section of the retaining bracket beyond the side edge of the surface of the one guide rail.

24. The longitudinal guide rail according to claims 15 or 23, wherein a protruding region of the support element has a rounded region which the retaining bracket contacts when it engages with the support element.

25. The longitudinal guide rail according to claim 15, wherein the one guide rail—in relation to the position of the longitudinal guide rail installed in a motor vehicle—forms a top rail.

26. The longitudinal guide rail according to claim 15, wherein the retaining bracket protrudes upwards from the longitudinal guide rail—in relation to the position of the longitudinal guide rail installed in a motor vehicle.

27. The longitudinal guide rail according to claim 15, wherein the belt forces—in relation to the position of the longitudinal guide rail installed in a motor vehicle—have a component upwards as well as a component perpendicular to the vertical and perpendicular to the longitudinal direction of the rail.

28. The longitudinal guide rail according to claim 15, wherein the support element is mounted on the surface of the one guide rail beyond the side edge of which it protrudes.

29. The longitudinal guide rail according to claim 15, wherein the support element is fixed on the one guide rail by means of a welded connection.

30. The longitudinal guide rail according to claim 15, wherein the fixing section of the retaining bracket is fixed on the one guide rail by means of at least one fixing element which engages in the one guide rail and the support element.

31. The longitudinal guide rail according to claim 30, wherein the fixing element is formed by a screw.

32. The longitudinal guide rail according to claim 31, wherein the screw is screwed by its threaded shaft into a fixing opening of the support element which has an internal thread.

33. The longitudinal guide rail according to claims 31 or 32, wherein the head of the screw projects into the space enclosed by the guide rails.

34. The longitudinal guide rail according to claim 15, wherein means are provided which counteract turning of the fixing section of the retaining bracket.

35. The longitudinal rail according to claim 15, wherein the fixing section of the retaining bracket engages by an end section remote from the retaining section into a further slot of the guide rail.

36. The longitudinal guide rail according to claim 35, wherein the length of the further slot in the longitudinal direction of the rail corresponds to an extension of the end section of the fixing section of the retaining bracket in this direction.

37. The longitudinal guide rail according to claims 35 or 36, wherein the fixing section of the retaining bracket is supported on an edge of the further slot by at least one stop perpendicular to the longitudinal direction of the rail.

38. The longitudinal guide according to claim 15, wherein the retaining section extends along a direction which runs substantially perpendicular to the longitudinal direction of the rail, wherein the support element is fixed on the one guide rail along a longitudinal side facing the retaining section of the retaining bracket.

39. The longitudinal guide rail according to claim 15, wherein the support element is a constituent part of a bearing element fixed on the one rail.

40. The longitudinal guide rail according to claim 39, wherein the bearing element is formed as a bearing block for a seat base.

* * * * *